United States Patent
Vaidya

(10) Patent No.: US 12,087,926 B2
(45) Date of Patent: Sep. 10, 2024

(54) SYSTEMS AND METHODS FOR BATTERY THERMAL MANAGEMENT

(71) Applicant: Cummins Power Generation Inc., Minneapolis, MN (US)

(72) Inventor: Pushkar Vaidya, Blaine, MN (US)

(73) Assignee: Cummins Power Generation Inc., Minneapolis, MN (US)

(*) Notice: Subject to any disclaimer, the term of this patent is extended or adjusted under 35 U.S.C. 154(b) by 0 days.

(21) Appl. No.: 18/221,873

(22) Filed: Jul. 13, 2023

(65) Prior Publication Data

US 2023/0361375 A1    Nov. 9, 2023

Related U.S. Application Data

(63) Continuation of application No. 16/989,124, filed on Aug. 10, 2020, now Pat. No. 11,728,533.

(51) Int. Cl.
| | |
|---|---|
| *H01M 10/627* | (2014.01) |
| *H01M 10/63* | (2014.01) |
| *H01M 10/633* | (2014.01) |
| *H02J 7/00* | (2006.01) |

(52) U.S. Cl.
CPC ....... *H01M 10/627* (2015.04); *H01M 10/633* (2015.04); *H02J 7/0013* (2013.01); *H02J 7/007* (2013.01); *H01M 10/63* (2015.04); *H01M 2220/10* (2013.01); *H02J 2207/20* (2020.01)

(58) Field of Classification Search
CPC .. H01M 10/627; H01M 10/633; H01M 10/63; H01M 2220/10; H02J 7/007; H02J 7/0013; H02J 2207/20

USPC .................. 320/128, 134, 140, 150, 153
See application file for complete search history.

(56) References Cited

U.S. PATENT DOCUMENTS

| | | | |
|---|---|---|---|
| 9,853,335 B2 | 12/2017 | Blackwelder et al. | |
| 10,147,984 B2 | 12/2018 | O'Hora | |
| 10,536,007 B2 | 1/2020 | Beaston et al. | |
| 2011/0282807 A1* | 11/2011 | Colello | H02J 3/008 320/128 |
| 2017/0069939 A1* | 3/2017 | Frutschy | H01M 10/63 |
| 2017/0279170 A1* | 9/2017 | O'Hora | H01M 50/204 |
| 2018/0123357 A1* | 5/2018 | Beaston | H02J 3/381 |
| 2018/0145382 A1 | 5/2018 | Harris et al. | |
| 2020/0072178 A1 | 3/2020 | Berkson et al. | |

OTHER PUBLICATIONS

Foreign Search Report on PCT PCT/US2021/045152 DTD Feb. 1, 2022.

(Continued)

*Primary Examiner* — Edward Tso
*Assistant Examiner* — Aaron Piggush
(74) *Attorney, Agent, or Firm* — Foley & Lardner LLP

(57) ABSTRACT

Systems and methods for managing the temperature of an energy storage system are provided. In some embodiments, the energy storage system includes a housing, a first terminal, a second terminal, an energy storage element disposed within the housing, a thermal management system, and a controller. In some embodiments, the energy storage element are configured to electrically connect to a load or a grid via the second terminal. The thermal management system is configured to manage a temperature within the housing and also configured to receive power from an external power source via the first terminal.

20 Claims, 8 Drawing Sheets

(56) References Cited

OTHER PUBLICATIONS

Non-Final Office Action on U.S. Appl. No. 16/989,124 DTD Dec. 13, 2022.
Notice of Allowance on U.S. Appl. No. 16/989,124 DTD Mar. 30, 2023.
Office Action in IN Application No. 202347011995, dated Jan. 5, 2024, 5 pgs.

* cited by examiner

SYSTEMS AND METHODS FOR BATTERY THERMAL MANAGEMENT

CROSS-REFERENCE TO RELATED APPLICATIONS

The present application claims priority under 35 U.S.C. § 120 and is a continuation of U.S. Patent Application of Ser. No. 16/989,124, titled "Systems and Methods for Battery Thermal Management," filed Aug. 10, 2020, which is hereby incorporated by reference in its entirety.

TECHNICAL FIELD

The present disclosure relates generally to the field of energy storage systems. More particularly, the present disclosure relates to systems and methods for controlling the internal temperature of energy storage systems.

BACKGROUND

Energy storage systems have been used in a variety of applications. For example, energy storage systems have been used in applications of electric vehicles, hybrid vehicles, consumer electronics, and military applications. In some applications, the energy storage system may not be connected to a load, charged, or otherwise used for a time period of days, weeks, months, or years. Further, the energy storage systems may be transported or deployed in a variety of climates. For example, the military may have two of the same energy storage systems with one being deployed in the arctic and another deployed in a desert. The extreme climates may impact the life of the energy storage system. The energy storage systems may be crucial during an emergency, thus the longevity and reliability of the energy storage systems are crucial.

SUMMARY

One embodiment of the disclosure relates to an energy storage system. The energy storage system includes a housing, a first terminal, an energy storage element disposed within the housing, a second terminal, a thermal management system configured to manage a temperature within the housing, and a controller coupled to the energy storage element and the thermal management system. The thermal management system is configured to receive power from an external power source via the first terminal. The energy storage element is configured to electrically connect to a grid via the second terminal.

Another embodiment relates to a controller of the energy storage system. The controller includes a processor that is configured to determine that the energy storage system is in a first state, the first state comprising the energy storage system electrically coupled to a grid or load via a second terminal of the energy storage system, in response to determining that the energy storage system is in the first state, electrically couple an energy storage element of the energy storage system to a thermal management system, determine that the energy storage system is in a second state, the second state comprising the energy storage system in a storage mode of operation, and in response to determining that the energy storage system is in the second state, electrically de-couple an energy storage element of the energy storage system from the thermal management system and electrically couple the thermal management system to a first terminal, the first terminal configured to relay power from an external power source to the thermal management system. The second state includes the energy storage system receiving power from the first terminal to power the thermal management system.

Another embodiment relates to a method of controlling a temperature of an energy storage system. The method includes determining, by a controller of an energy storage system, that the energy storage system is in a first state, the first state comprising the energy storage system providing electrical power to a load via a second terminal of the energy storage system, in response to determining that the energy storage system is in the first state, electrically coupling, via the controller, an energy storage element of the energy storage system to a thermal management system of the energy storage system, determining, via the controller, that the energy storage system is in a second state, the second state comprising the energy storage system being turned off such that no power from the energy storage system is being provided via the second terminal, and in response to determining that the energy storage system is in the second state, electrically coupling, via the controller, the thermal management system to a first terminal.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
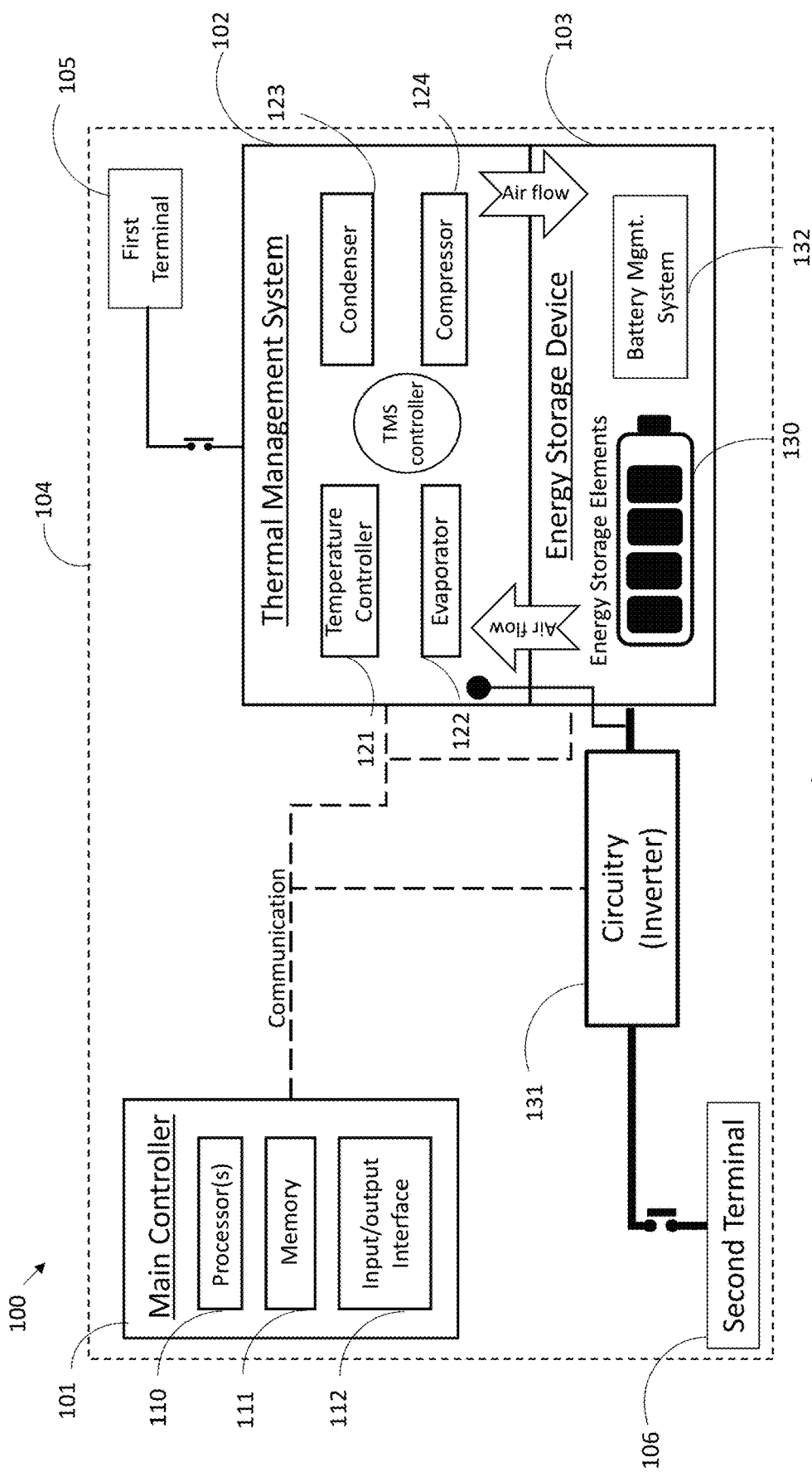
FIG. 1 is a block diagram illustrating an energy storage system according to an exemplary embodiment.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting. This application incorporates by reference U.S. application Ser. No. 15/802,164 filed on Nov. 17, 2017 entitled, "Energy Storage System."

Referring generally to the figures, systems and methods that may be used to manage the temperature of an energy storage system are provided according to exemplary embodiments. One or more energy storage systems are used to provide power to one or more loads. The load may be directly connected to one or more energy storage systems or the one or more energy storage systems may be connected to a micro or local power grid. An energy storage system has an energy storage device (e.g., batteries, capacitors, etc.) that may be charged using power from a power grid. Once charged, the energy storage system may be moved, transported, or placed in storage (e.g., within a warehouse or trailer) until the energy storage system is needed. The energy storage system may be used in the event of a power outage, power shortage, or away from a primary power grid (e.g., to set up a base that is not near utility power grids).

The temperature of the energy storage system, particularly the temperature around the energy storage device, should be controlled in order to prevent the energy storage device from being exposed to extreme temperatures that may impact the amount of power stored by, life of, and/or the reliability of the energy storage system. In particular, during storage, an energy storage system may be vulnerable to reach temperatures of the surrounding climate. For example, in the arctic, the energy storage system may be exposed to temperature levels below minus 40 degrees Fahrenheit, and, in the desert, the energy storage system may be exposed to temperature levels above 100 degrees Fahrenheit and the extreme temperatures may affect the reliability and efficiency of the energy storage system. However, controlling the temperature of the area around the energy storage system may not be feasible or practical in some applications. Further, an on-board thermal management system that is powered from the energy storage device will decrease the amount of power that the energy storage device has stored. To address these issues, an on-board thermal management system that may be selectively connected to an external power source at least for durations of storage and transport is disclosed.

An exemplary energy storage system includes a housing, an energy storage device disposed within the housing, and a thermal management system disposed at least partially within the housing. The housing may be designed with one or more hooks, handles, or openings that allows the energy storage system to be moved either manually or via machine (e.g., a forklift). The energy storage device may include one or more batteries (e.g., lithium-ion batteries) or other energy storage elements. Further, the energy storage device may include circuitry that is configured to charge the one or more batteries when the energy storage system is connected to a power grid (e.g., via a second set of electrical terminals) and configured to provide power to the power grid via either direct current (DC) or alternating current (AC). For example, the circuitry may include an inverter configured to convert the DC power of the one or more batteries into an AC power. The thermal management system is configured to control the temperature within the housing (e.g., around the energy storage device). During a first state (e.g., where the energy storage system is providing power to a grid or charging the energy storage elements via the second terminals, the thermal management system may be configured to operate from the energy of the energy storage element or power from the grid. During a second state (e.g., where the energy storage system is not providing or receiving power to a grid via the second terminals), the thermal management system may be configured to operate from power received from an external power source (e.g., via a first terminal). In this way, the temperature within the housing may be maintained, managed, or controlled during times when the energy storage system is not in use without affecting the amount of energy stored in the energy storage device, which increases the reliability, longevity, and efficiency of the energy storage system.

Referring to FIG. 1, a block diagram illustrating an energy storage system 100 is shown according to an exemplary embodiment. The energy storage system 100 includes a controller 101, a thermal management system 102, an energy storage device 103, and housing 104. The housing 104 may include one or more rigid elements that are configured to be coupled together in order to define a cavity. The controller 101, thermal management system 102, and energy storage device 103 may each be disposed at least partially within the housing 104. The housing 104 may also include one or more vents that may be actuated by the controller 101 and/or the thermal management system 102.

The controller 101 is communicably coupled to the thermal management system 102 and energy storage device 103. The controller 101 may be configured to control (e.g., via one or more signals) the operations state of the thermal management system 102 and the energy storage device 103. The controller 101 may include a processor 110, a memory 111, and an input/output interface 112. In some embodiments the controller 101 may be integrated or in communication with various electronic devices. For example, in some embodiments, the controller 101 may be integrated with or in communication with a personal computer, server system, or other computational device. In some embodiments, the various electronic devices may assist with any of the operations described herein. In some embodiments, the various electronic devices may be used to program the controller 101. In some embodiments, the controller 101 may also include one or more additional processors, application specific integrated circuit (ASICs), or circuity that are designed to cause or assist with the energy storage system 100 in performing any of the steps, operations, processes, or methods described herein.

The controller 101 may implement any logic, functions or instructions to perform any of the operations described herein. The controller 101 can include memory 111 of any type and form that is configured to store executable instructions that are executable by any of the circuits, processors, or hardware components. The executable instructions may be of any type including applications, programs, services, tasks, scripts, libraries processes and/or firmware. In some embodiments, the memory 111 may include a non-transitory computable readable medium that is coupled to the processor 110 and stores one or more executable instructions that are configured to cause, when executed by the processor 110, the processor 110 to perform or implement any of the steps, operations, processes, or methods described herein.

In some embodiments, input/output interface 112 of the controller 101 is configured to allow the controller 101 to communicate with or control various components of the thermal management system 102, the energy storage device 103, other electronic devices, or receive inputs from a user (e.g., via a graphical user interface). In some embodiments, the input/output interface 112 may be configured to allow for a physical connection (e.g., wired or other physical electrical connection) between the controller 101 and the thermal management system 102 and the energy storage device 103. In some embodiments, the input/output interface 112 may include a wireless interface that is configured to allow wireless communication between the controller and the thermal management system 102 (e.g., an ASIC, processor, or controller of the thermal management system 102), external computing devices, and/or the energy storage device 103. The wireless communication may include a Bluetooth, wireless local area network (WLAN) connection, radio frequency identification (RFID) connection, or other types of wireless connections. In some embodiments, the input/ output interface 112 also allows the controller 101 to connect to the interne (e.g., either via a wired or wireless connection). In some embodiments, the input/output interface 112 also allows the controller 101 to connect to other devices such as a display or elements such as switches, sensors, or temperature probes.

The energy storage device 103 includes an energy storage element 130 and battery management system 132. The energy storage device 103 is configured to store energy during a charging state and configured to provide power to a grid or a load during an operational state. The energy storage device 103 may also be configured to provide power to the thermal management system 102 when in the operational state. The energy storage element 130 may include one or more batteries, capacitors, lithium ion batteries, or a combination thereof. The battery management system 132 may be in communication with or controlled by the controller 101. The energy storage system 100 includes an inverter 131 configured to convert DC to AC, rectifying circuits configured to convert AC to DC, and/or other power conditioning or converting circuits. In some embodiments, the inverter 131 is electrically located between the energy storage element 130 and a second set of terminals 106. The second set of terminals 106 are configured to allow the energy storage system 100 to electrically couple to a corresponding power grid, local grid, or load. In some embodiments, the second set of terminals 106 may be used to charge the energy storage element 130 and to provide power (e.g., discharge the energy storage element 130) to a grid or a load. In some embodiments, the energy storage system 100 may be configured to provide one, two, three, four, or more phases of power to a grid or a load. In some embodiments, the energy storage system 100 may be configured to allow charging the energy storage element 130 from one, two, three, four or more phases of power. In some embodiments, multiple energy storage systems 100 may be connected to the grid in parallel and act as power sources within the grid.

The thermal management system 102 is configured to control the temperature within the housing 104 (e.g., within the cavity of the housing 104 or more particularly around the energy storage element 130). The thermal management system 102 may include a temperature controller 121 (i.e., a second controller), evaporator 122, condenser 123, compressor 124, or other temperature and climate control devices. For example, in some embodiments, the thermal management system 102 may additionally or alternatively include one or more heating elements, fans, airflow devices, actuating vents, sensors, temperature probes, or similar devices. In some embodiments, the exact elements included within the thermal management system 102 may be dependent upon a particular application (e.g., a known deployment location) intended for the energy storage systems 100.

The energy storage system 100 also includes a first terminal 105 (e.g., an auxiliary terminal). The first terminal 105 is electrically coupled to the thermal management system 102 either directly or indirectly (e.g., via a switch or contact) such that the first terminal 105, when connected to an external power source, may supply the thermal management system 102 with power to operate, monitor, maintain, adjust, or otherwise control the temperature around the energy storage element 130. In some embodiments, the thermal management system 102 or controller 101 is configured to control corresponding circuitry (e.g., switches) in order to allow power received at the first terminal 105 to be received and used by the thermal management system 102.

In some embodiments, circuitry corresponding to the first terminal 105 may be configured such that any time the first terminal 105 is receiving power over a particular voltage or current threshold, the thermal management system 102 is able to receive the power. For example, in some embodiments, the circuitry corresponding to the terminal may include one or more diodes configured to allow power received at the first terminal 105 to be received by the thermal management system 102. In some embodiments, the first terminal 105 may be configured to connect to an 110V AC power supply (e.g., a wall outlet in the United States). In some embodiments, corresponding circuitry of the first terminal 105 may be configured to allow the thermal management system 102 to receive AC power. In some embodiments, corresponding circuitry of the first terminal 105 may be configured to convert AC (e.g., 110V at 60 hertz, 208V at 60 hz, etc.) to DC (24 Volts) and provide the thermal management system 102 with the DC power (e.g., via the use of an adapter or rectifying circuit).

In some embodiments, the first terminal 105 includes a male or female end of a plug that can be connected (e.g., via an extension cord or other cord) to an outlet of a power grid or other power supply. In some embodiments, the first terminal 105 includes one or more electrical terminals that allow the terminal to the hardwired to an external power source. In some embodiments, power received via the first terminal 105 only provides power to the thermal management system 102 (e.g., not to charge the energy storage element 130).

It should be noted that various other components can be included in the energy storage system 100 that are not shown for sake of clarity of the present embodiments. These can include various power and/or signal conditioning components such as power busses, sensors, probes, displays, inverters, or other temperature conditioning elements. Such additional components can be included in the energy storage system 100 as appropriate for the particular embodiment.

Figure 2:
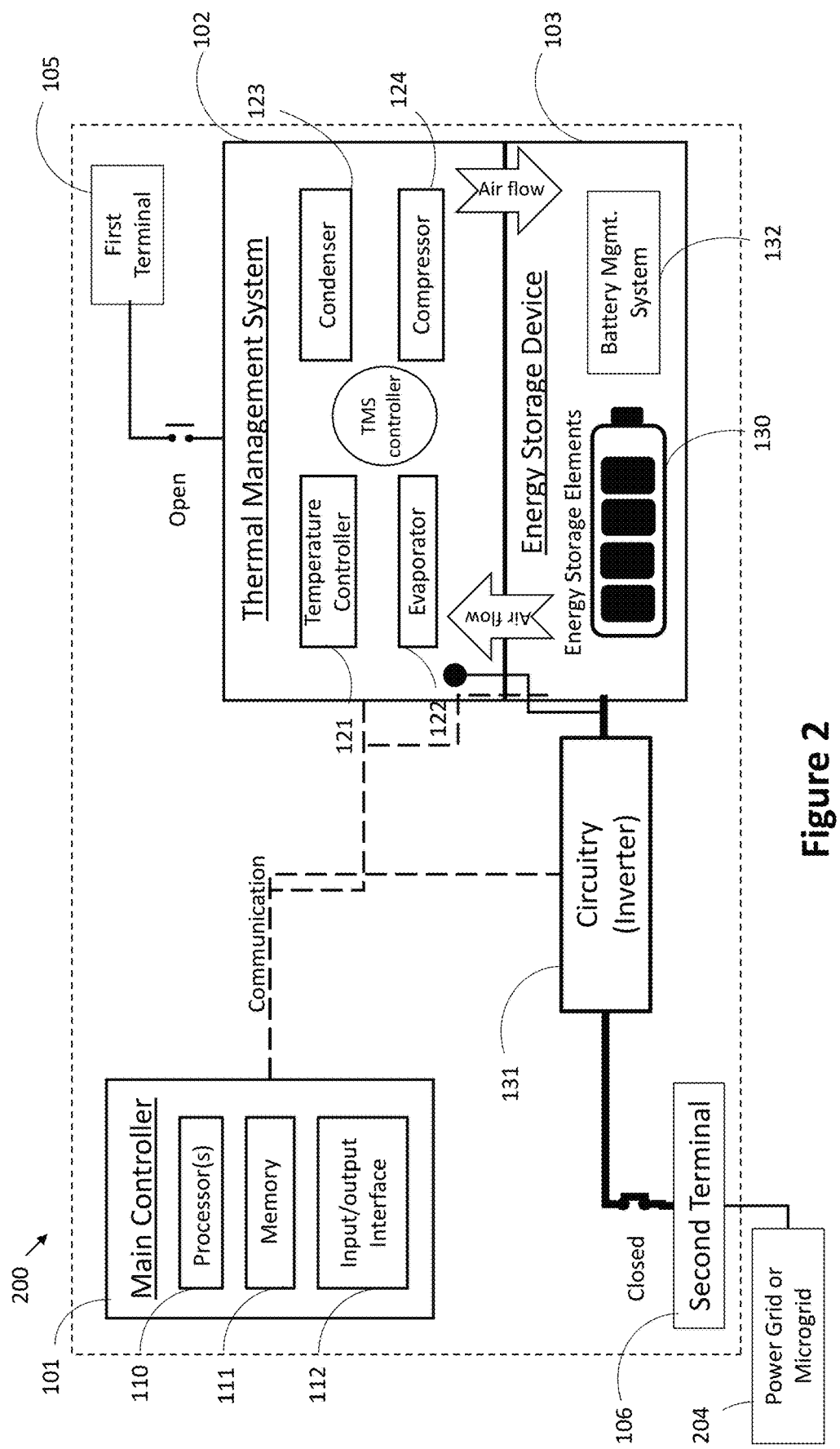
FIG. 2 is a schematic diagram illustrating an energy storage system in a first state according to an exemplary embodiment.
Figure 3:
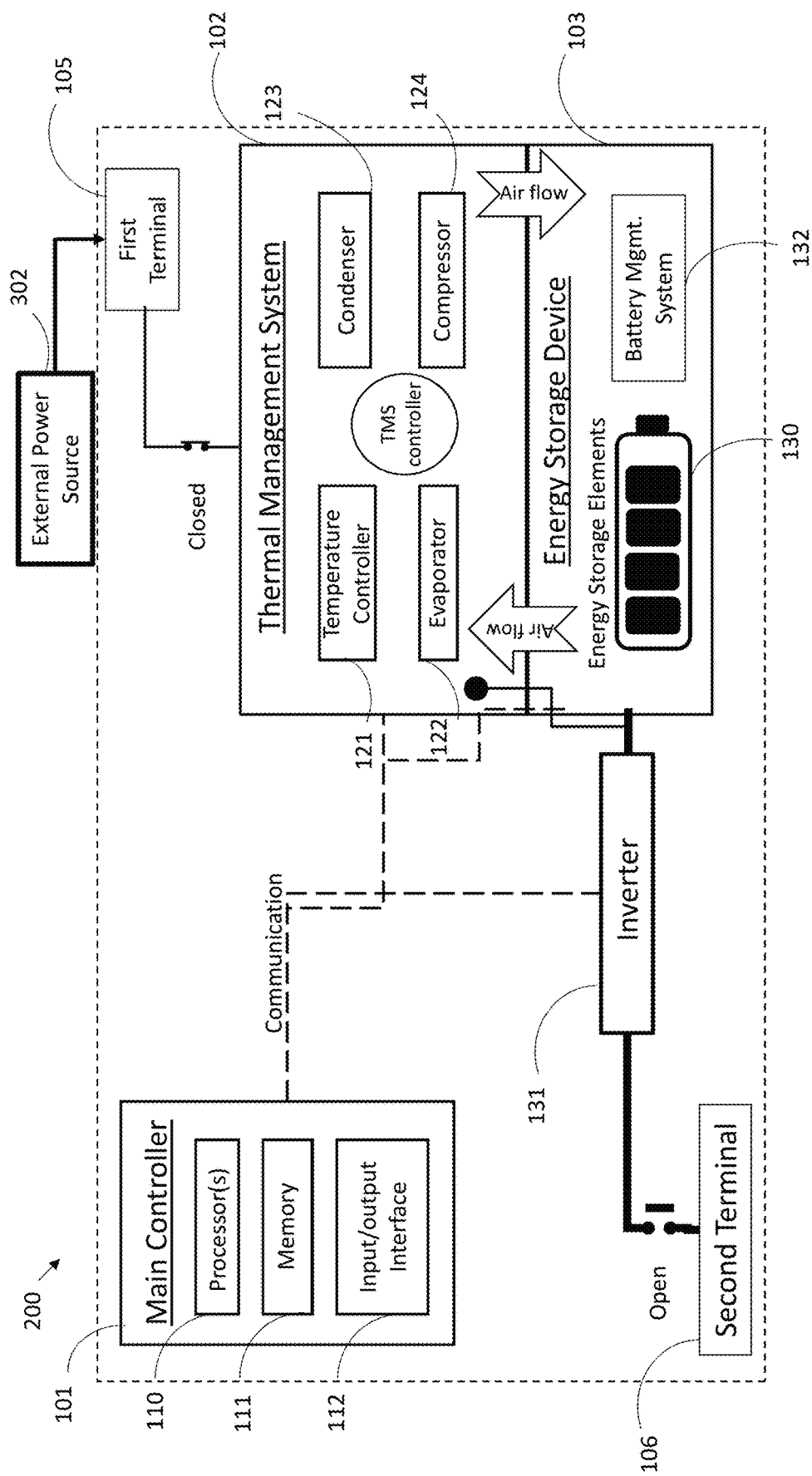
FIG. 3 is a schematic diagram illustrating an energy storage system in a second state according to an exemplary embodiment.

FIGS. 2 and 3 are referenced in tandem for purposes of demonstration. FIG. 2 is a schematic diagram illustrating an energy storage system in a first state 200 according to an exemplary embodiment. The first state 200 depicts the energy storage system 100 coupled to a power grid 204 (e.g., a micro-grid). FIG. 3 is a schematic diagram illustrating an energy storage system in a second state 300 according to an exemplary embodiment. The second state 300 depicts the energy storage system 100 coupled to an external power source 302.

In the first state 200, a the second terminal 106 of the energy storage system 100 is connected to a power grid 204 such that the power grid 204 may either be receiving power from or supplying power to the energy storage system 100 (e.g., the energy storage system 100 is in an operational state). In some embodiments, the energy storage system 100 may be connected to and supplying power directly to a load. In some embodiments, the power grid 204 is also connected to one or more generators, or other energy storage systems. In some embodiments, the power grid 204 is a micro or local power grid. In some embodiments, the energy storage system 100 is supplying or receiving power from the power grid 204 that has one, two, three, four, or more phases. In some embodiments, the energy storage system 100 is receiving power from the power grid 204 and charging the energy storage element 130. In some embodiments, the energy storage system 100 is supplying power to the power grid 204 from the energy storage element 130.

In the first state 200, the thermal managements system 102 may receive energy from the energy storage element 130 and/or the power grid 204 in order to operate and manage the temperature around or of the energy storage element 130. In some embodiments, the power received from the energy storage element 130 and/or the power grid 204 is DC or AC power. In some embodiments, the power received from the energy storage element 130 and/or the power grid 204 operates a temperature controller of the thermal management system 102 and drives one or more drives of a condenser, or other component of the thermal management system 102.

In the second state 300, the energy storage system 100 is not supplying or receiving power from a power grid (e.g., the energy storage system 100 is in a storage mode). In the second state 300, the first terminal 105 may be connected to an external power source 302. Examples of an external power source 302 may include an external battery, battery pack, outlet of a utility power grid, generator, alternator, or other power source. In some embodiments, the energy storage system 100 may have circuitry configured to condition or convert the power from the external power source 302 into a different form, voltage, phase, or frequency (e.g., AC to DC, DC to AC, DC to DC, AC to AC).

The external power source 302 is configured to supply power to the energy storage system 100 in order for the thermal management system 102 to operate. That is, in some embodiments, the external power source 302 is not used or able to charge the energy storage element 130. Rather, the external power source 302 enables the thermal management system 102 to operate and keep the internal temperature (e.g., temperature of or around the energy storage element 130) within a pre-determined range (e.g., within the range of 32-75 degrees Fahrenheit). In some embodiments, the pre-determined range may be set via a user interface and/or changed via a user interface. In some embodiments, the predetermined range may be set narrower (e.g., 65-71 degrees Fahrenheit) or broader (e.g., 30-90 degrees Fahrenheit) depending upon the type of, capacity, of the external power source being utilized or the particular climate that the energy storage system 100 is in. It is to be appreciated that the exact values of the predetermined range with be dependent upon the characteristics, types, and forms of energy storage element(s) 130 implemented.

Figure 4:
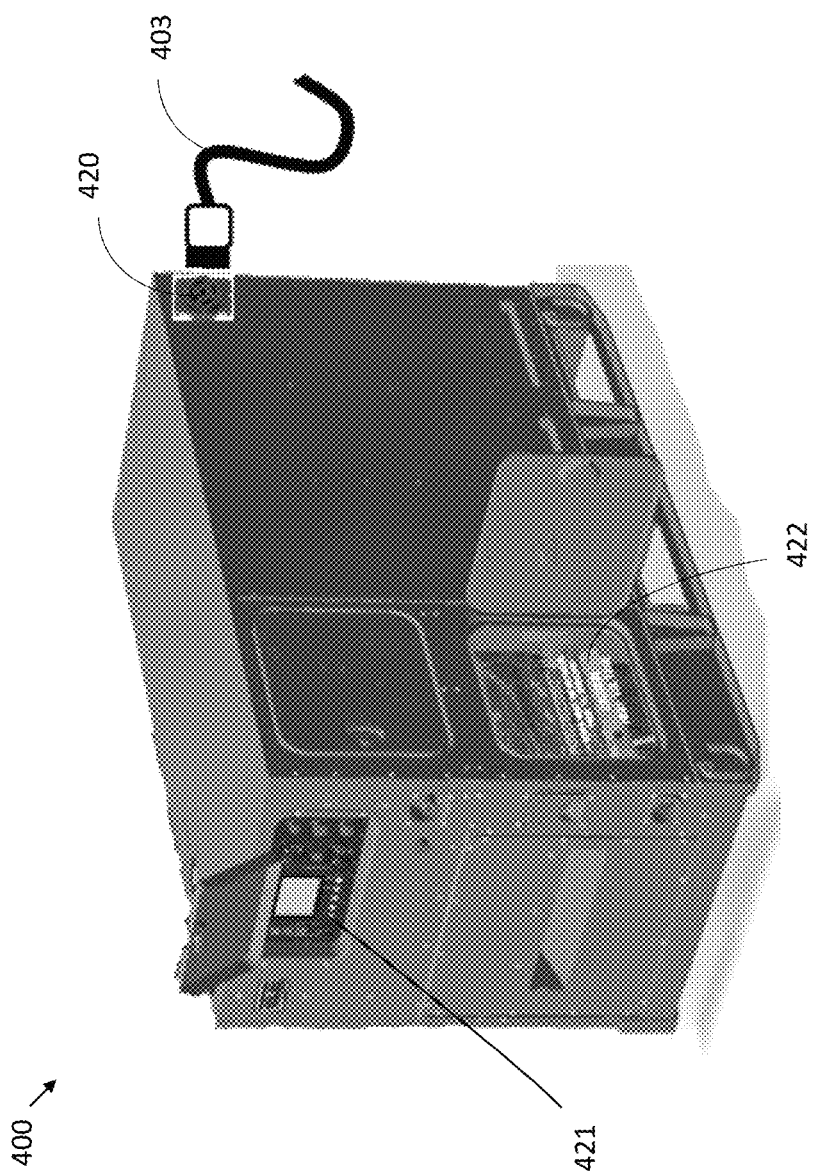
FIG. 4 is an isometric view of energy storage systems according to an exemplary embodiment.

Referring to FIG. 4, an isometric view of energy storage system 400 is shown according to an exemplary embodiment. The energy storage system 400 depicts an example of a form factor of the energy storage system 100. The energy storage system 400 includes a control panel 421, a view of an example second terminal 422, and an example of a first terminal 420.

As discussed above, the exact configuration of the second terminal 422 (e.g., size and number) may be dependent upon the particular energy storage system 400. For example, the terminals 422 may change in number dependent upon whether the second energy storage system 400 is designed to output one, two, three, or more phases at particular voltages and currents. Also, as discussed above, the exact form and type of the first terminal 420 may be dependent upon the country or location that the second energy storage system 400 is to be deployed, the type of corresponding circuitry to the first terminal 420, or other considerations. In this example, the first terminal 420 is depicted as a receptacle that is configured to receive a corresponding plug from an extension cord 403. A second plug of the extension cord may then be plugged into a wall outlet or other corresponding power outlet.

Figure 5:
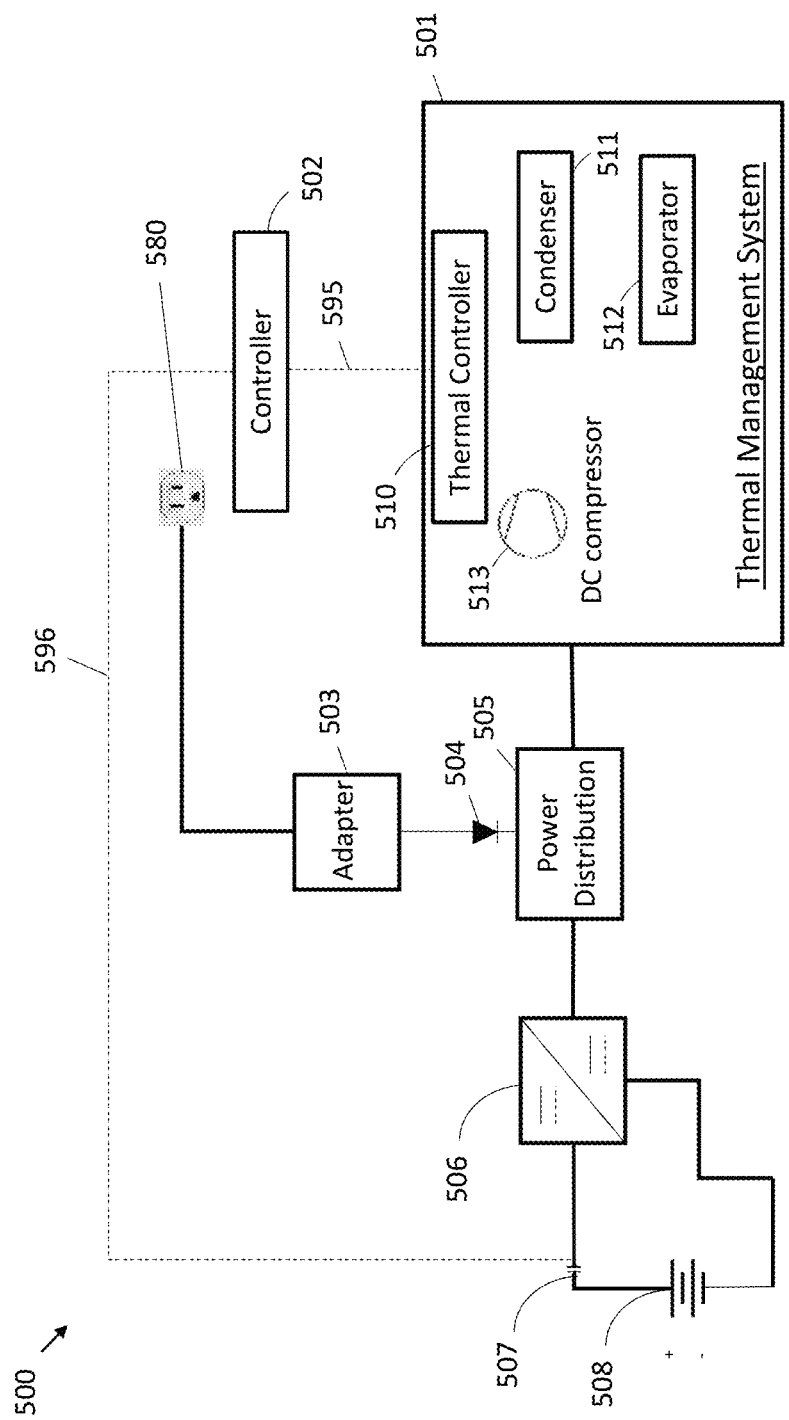
FIG. 5 is a schematic diagram illustrating an energy storage system according to an exemplary embodiment.
Figure 6:
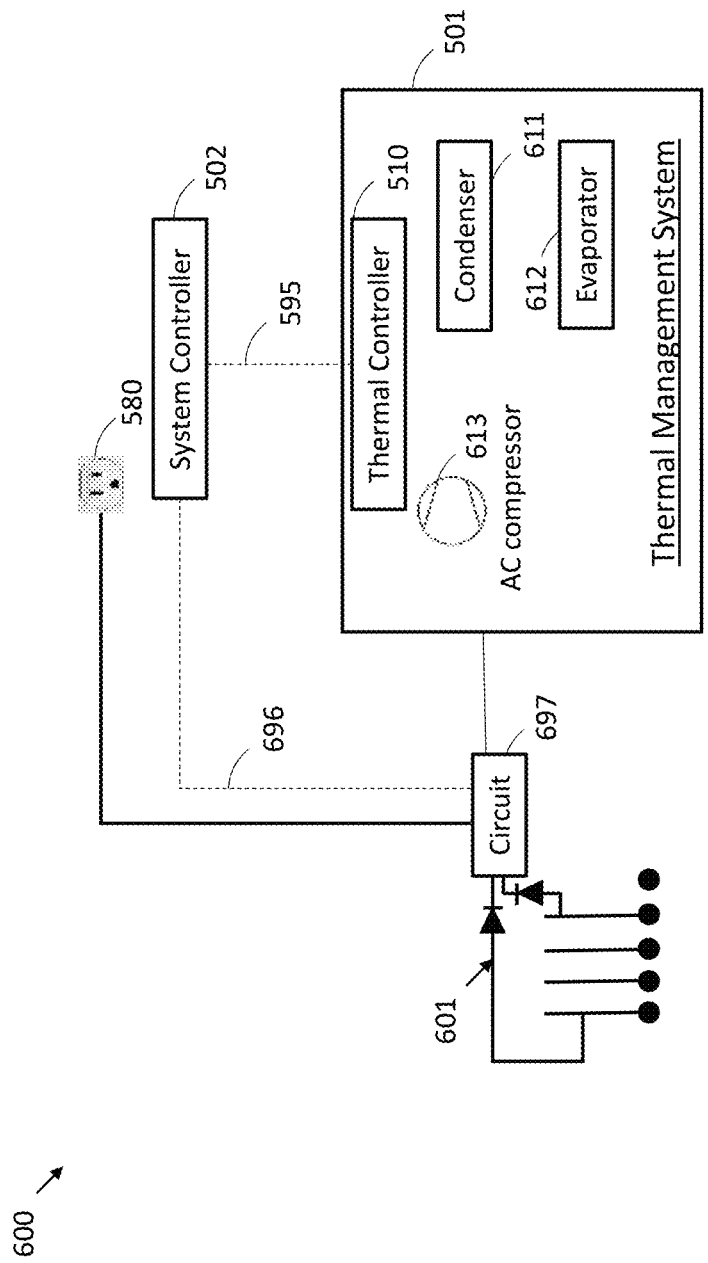
FIG. 6 is a schematic diagram illustrating an energy storage system according to an exemplary embodiment.

Reference to FIGS. 5 and 6 are made in tandem for purposes of demonstration. FIG. 5 depicts a schematic diagram illustrating an energy storage system 500 according to an exemplary embodiment. FIG. 6 depicts a schematic diagram illustrating an energy storage system 600 according to an exemplary embodiment. The energy storage systems 500 and 600 includes a thermal management system 501 and a controller 502. The controller 502 may be similar to the controller 101 discussed herein. The controller 502 is communicably coupled to the thermal management system 501 via a communications connection 595. The energy storage systems 500 and 600 are configured to receive energy from an external power source 580 in order to operate the thermal management system 501. In this example, the external power source 580 is depicted as a 110V single phase wall outlet. However, as discussed herein, in different embodiments, the energy storage system 500 and 600 may be designed to receive power from an external power source having various plug types, voltages, phases, or frequencies.

Referring to FIG. 5, the energy storage system 500 includes a terminal that is configured to allow an electrical connection between the external power source 580 and the energy storage system 500. In some embodiments, the energy storage system 500 includes a terminal that is configured to (e.g., of the design to) receive power from a corresponding adapter 503. In some embodiments, the energy storage system 500 the adapter may be located within the energy storage system 500 such that the terminal connects directly to the external power source and energy from the external power source 580 is converted or conditioned by the adapter 503 after being received via the terminal.

The energy storage system 500 includes an energy storage element 508, a switch 507 (e.g., a contact), a DC to DC converter 506, and a power distribution block 505. The energy storage element 508 are connected to the DC to DC converter 506 via a connection that is breakable or openable via the switch 507. In some embodiments, the controller 502 may control the state of the switch 507 (e.g., open or closed). That is, in some embodiments, the switch 507 is a static electronic component that may be controlled by the controller 502. The DC to DC converter 506 is configured to receive the DC energy from the energy storage element 508 and output a signal having a DC voltage at a particular level (e.g., 24V). The output from the DC to DC converter 506 is received by the power distribution block 505. The power distribution block 505 may be connected to the thermal management system 501 and configured to supply energy to the thermal controller 510 and drive, for example, a 24 V DC compressor 513, condenser 511, and evaporator 512. In this way, when the switch 507 is closed, the thermal management system 501 is configured to operate from power received from the energy storage element 508. In some embodiments, the controller 502 may also be connected to and receiving power from the power distribution block 505.

Additionally, power from the external power source 580 (e.g., at 110V AC) may be received by the adapter 503 and the adapter 503 may output a DC signal (e.g., 24 V) to the power distribution block 505. In some embodiments, an output of the adapter 503 is connected to an input of the power distribution block 505 with a diode 504 in the connection. In some embodiments, the diode is configured to only allow current (e.g., energy) into to the power distribution block 505 such that no current or energy may be extracted from the terminal. In this way, energy from the external power source 580, via the terminal, may be used to power the thermal management system 501 partially or not at all (depending on currents and voltage levels of the adapter and power distribution block) when the switch 507 is closed. Further, when the switch 507 is open, energy from the external power source 580 may be used to completely operate the thermal management system 501.

Referring to FIG. 6, the energy storage system 600 includes a terminal that is configured to allow an electrical connection between the external power source 580 and the energy storage system 600. The energy storage system 600 includes an energy storage element that are connected to an inverter via the power cables 601 with diodes in order to output an AC electrical signal into the circuit 697 and prevent power flow from feeding back into the inverter. The circuit 697 is also configured to receive AC power from the external power source 580. In some embodiments, the circuit 697 may include a breaker, various diodes, or switches. The circuit 697 may receive AC power from either or both from the energy storage element and supply the thermal management system 501 with power to operate. In some embodiments, the thermal management system 501 may include an AC compressor 613, condenser 611, and evaporator 612. In this way, the AC energy from the circuit 697 may be able to directly drive one or more of the various components of the thermal management system 501.

It is to be appreciated that FIGS. 5 and 6 are meant by way of example and that other embodiments are contemplated. For example, in some embodiments, a thermal management system may have a various components such as a compressor configured to be powered by variable frequency drives (VFD). In such an embodiment, the VFD compressor or other components may be configured to operate or be driven from AC power received from an external power source via the terminal or configured to operate or be driven from DC power received from the energy storage elements.

Figure 7:
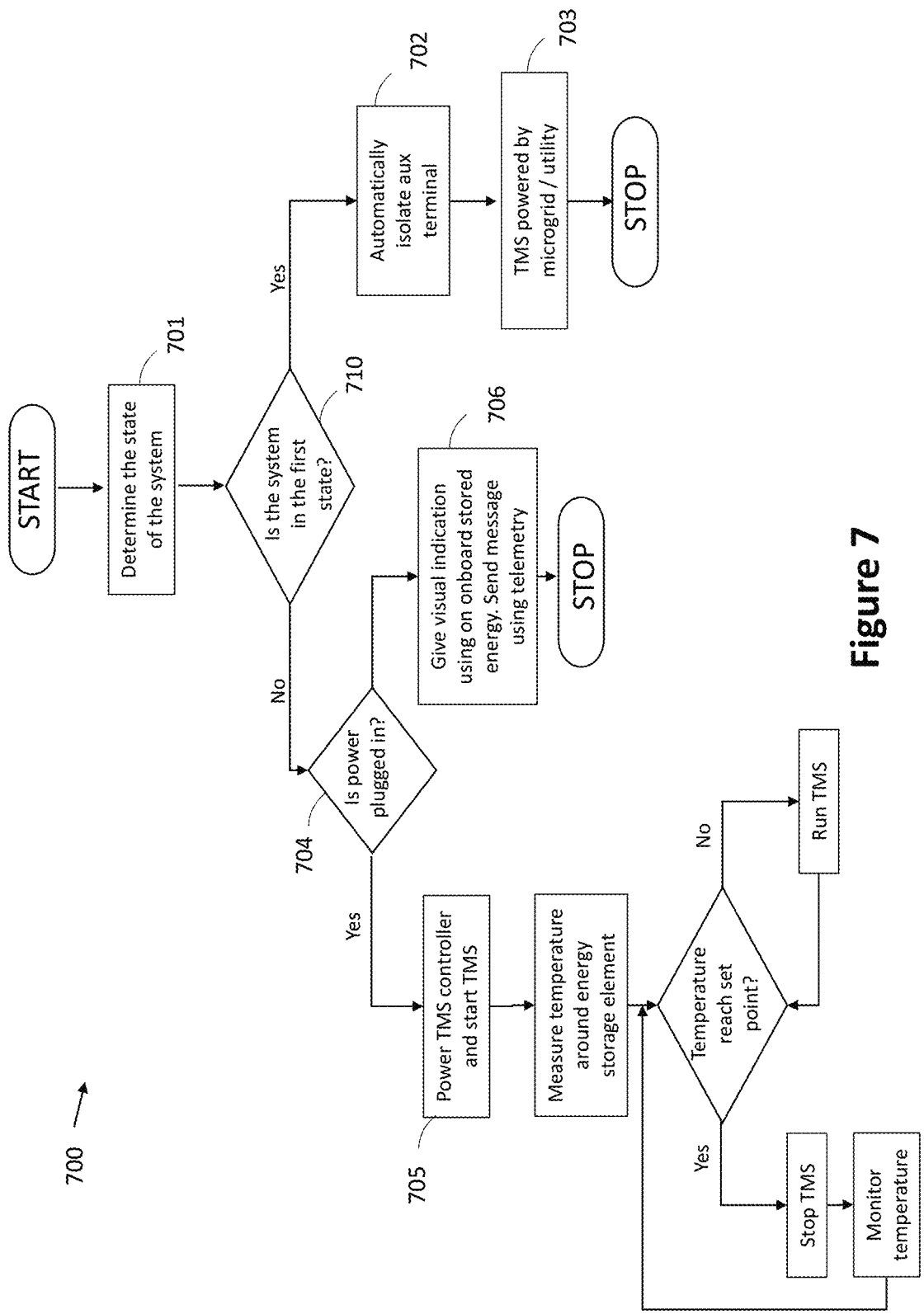
FIG. 7 is a flow diagram of a method of controlling temperature within an energy storage system according to an exemplary embodiment.

Referring to FIG. 7, a flow diagram of a method 700 of controlling temperature within an energy storage system is shown according to an exemplary embodiment. In an operation 701, a controller determines the state of the energy storage system. At decision block 710, the controller determines whether the energy storage system is in a first state. In some embodiments, the first state includes the energy storage system being connected to a power grid or load via a second terminal of energy storage system. In some embodiments, the first state includes the energy storage system providing power to or receiving power from the power grid. In some embodiments, the first state includes a user manually switching a switch or manually entering an input (e.g., via a display presenting a graphical user interface) to put the energy storage system into the first state. The controller may determine that the energy storage system is in the first state by detecting or monitoring for electrical connections between the second terminal and power grid or in response to receiving an input.

If the energy storage system determines that the energy storage system is in the first state, the energy storage system then proceeds to operation 702. In operation 702, the energy storage system isolates the first terminal and causes the thermal management system to be powered by the power on the power grid in operation 703. That is, in operation 702, the energy storage system may cause a switch or contact to open such that the thermal management system does not receive power via the first terminal. Further, in energy storage system the controller may cause a switch or contact to close such that the thermal management system receives power from the energy storage elements and/or the power grid.

If the controller determines that the energy storage system is not in the first state (e.g., that the energy storage system is in the second state), the controller proceeds to operation 704. In some embodiments, the energy storage system may determine that the energy storage system is not in the first state if the energy storage system detects that the second terminal is not electrically coupled to the power grid. In some embodiments, the energy storage system may determine that the energy storage system is not in the first state in response to receiving a manual input. In some embodiments, in response to determining that the energy storage system is not in the first state, the energy storage system may cause a contact or switch to open such that the thermal management system does not receive power (e.g., is electrically disconnected or isolated from) the energy storage element and/or the second terminal.

In operation 704, the energy storage system determines whether the first terminal is connected to an external power supply. If the energy storage system determines that the first terminal is connected to the external power supply, the energy storage system may cause a switch or contact to close such that the thermal management system receives power from the external power supply via the first terminal at operation 705. In response to the thermal management system receiving power via the first terminal from the external power supply, the thermal management system may operate by measuring the temperature around the storage element and operating the thermal management system such that a temperature set point is reached and maintained.

If the energy storage system determines at operation that the first terminal is not connected to the external power supply, the energy storage system may output a visual indication on a display or send a message to a user device via the input/output interface indicating that the energy storage system is not plugged into the external power supply at operation 706.

Figure 8:
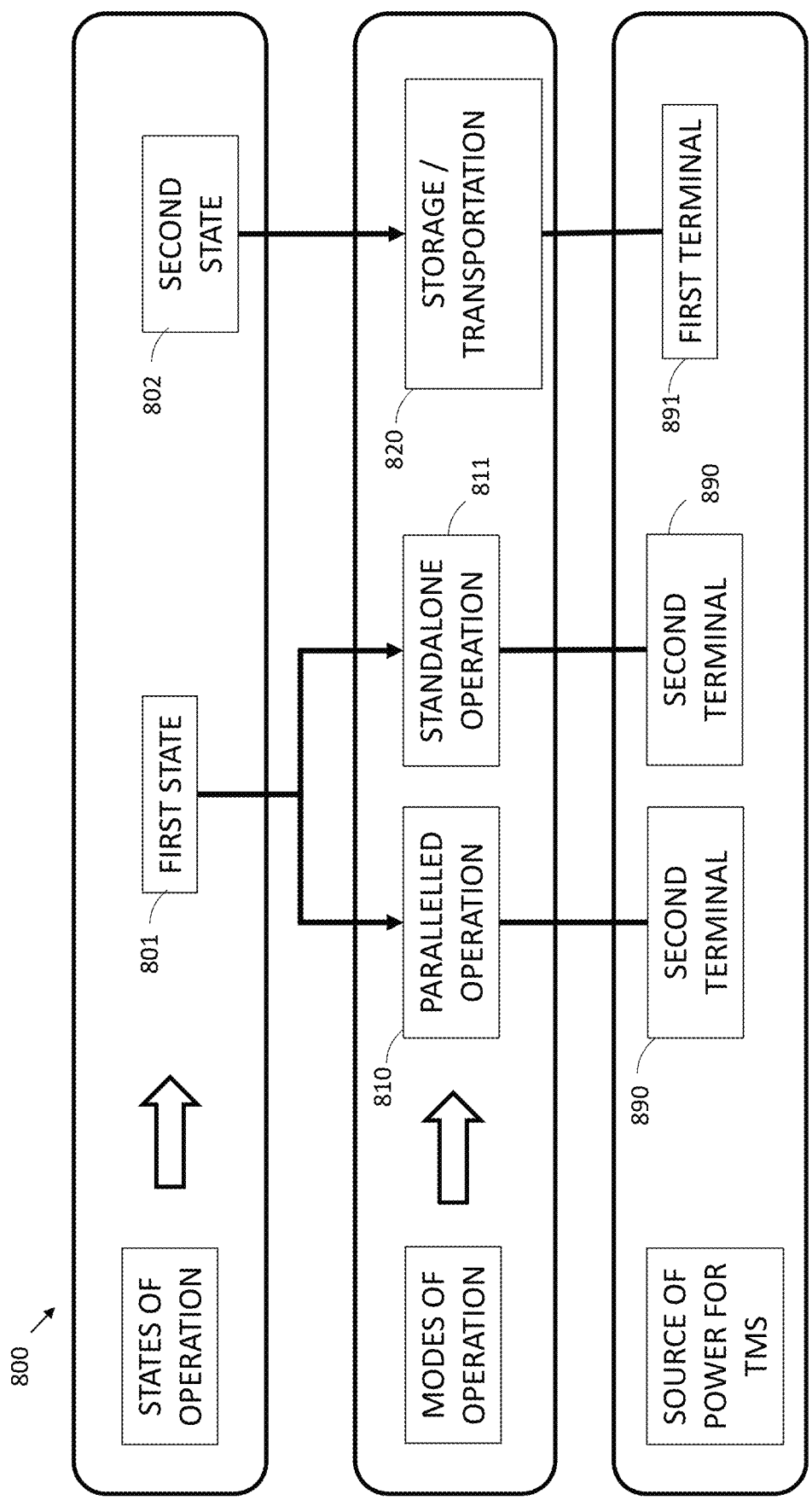
FIG. 8 is a state diagram of an energy storage system according to an exemplary embodiment.

Referring to FIG. 8, a state diagram 800 of an energy storage system is shown according to an exemplary embodiment. In a first state 801, the energy storage system is configured to receive power via the second terminal 890. Further in the first state 801, the energy storage system may have a first mode of operation 810 and a second mode of operation 811. In the first mode of operation 810, the thermal management system is configured to receive power from the power grid via the second terminal and/or the energy storage element. In the second mode of operation 811, the energy storage system may be supplying power to a load via the second terminal and the thermal management system receives power from the energy storage element (e.g., via connecting the thermal management system to the second terminal and thereby the energy storage element).

In a second state 802, the energy storage system is configured to receive power via the first terminal 891. That is, in the second state 802, the first terminal may be connected to an external power supply and the energy storage system may electrically connect the first terminal to the thermal management system such that the thermal management system receives power from the external power supply via the first terminal. The second state 802 may indicate that the energy storage system is not in an operational use mode, is not connected to a power grid via the second terminal, or otherwise is in a storage or transportation mode of operation 820.

Additionally, the energy storage system, in response to detecting or determining the second state, may output a signal configured to open a switch or contact such that no power from the one or more energy storage element may be received by the thermal management system. That is, the controller may control circuitry such that the thermal management system does not use power from the storage element when the energy storage system is in the second state.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable storage media for carrying or having machine-executable instructions or data structures stored thereon. Such machine-readable storage media can be any available media that can be accessed by a computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a computer or other machine with a processor. Combinations of the above are also included within the scope of machine-readable storage media. Machine-executable instructions include, for example, instructions and data which cause a computing device or machine to perform a certain function or group of functions. Machine or computer-readable storage media, as referenced herein, do not include transitory media (i.e., signals in space).

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a computing device that includes, for example, a processing unit, a system memory, and a system bus that couples various system components including the system memory to the processing unit. The system memory may include read only memory (ROM) and random access memory (RAM) or other non-transitory storage medium. The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:
1. An energy storage system, comprising:
a housing;
a first terminal;
a thermal management system configured to manage a temperature within the housing, the thermal management system configured to receive power from an external power source via the first terminal;
a second terminal;
an energy storage element disposed within the housing, the energy storage element configured to electrically connect to a grid via the second terminal; and a controller coupled to the energy storage element and the thermal management system, the controller configured to:
  power the thermal management system, during a state of the energy storage system in which power is conveyed via the first terminal and no power is conveyed via the second terminal;
  monitor temperature around the energy storage element; and
  in response to a determination that the temperature has not reached a set point, activate the thermal management system to manage the temperature within the housing.

2. The energy storage system of claim 1, wherein the controller is configured to deactivate the thermal management system in response to a determination that the temperature reaches the set point.

3. The energy storage system of claim 1, wherein the controller is configured to:
  determine whether the first terminal is connected to an external power supply; and
  in response to a determination that the first terminal is connected to the external power supply, power the thermal management system.

4. The energy storage system of claim 3, wherein the controller is configured to:
  in response to a determination that the first terminal is not connected to the external power supply, output a visual indication on a display or send a message to a user device indicating that the energy storage system is not connected to the external power supply.

5. The energy storage system of claim 1, wherein the thermal management system includes at least one of a heating element, a fan, an airflow device, an actuating vent, or a sensor.

6. The energy storage system of claim 1, wherein the first terminal is configured such that the thermal management system receives power when the first terminal receives power over a current threshold.

7. The energy storage system of claim 1, wherein the thermal management system is configured to maintain an internal temperature within a predetermined range.

8. The energy storage system of claim 7, wherein the predetermined range is set or changed based on a characteristic of the energy storage element or the energy storage system.

9. The energy storage system of claim 1, wherein the controller is further configured to re-activate the thermal management system to manage the temperature within the housing, responsive to a second determination that the temperature has not reached the set point after deactivation of the thermal management system.

10. The energy storage system of claim 1, wherein the controller is further configured to power the thermal management system via the grid, responsive to determining that the power is conveyed via the second terminal.

11. A controller of an energy storage system including a first terminal and a second terminal, comprising:
  one or more processors configured to:
    detect that the energy storage system is in a first state, the first state comprising the energy storage system configured to electrically provide or receive power to a grid via the second terminal of the energy storage system;
    in response to determining that the energy storage system is in the first state, electrically couple an energy storage element of the energy storage system to a thermal management system;
    detect that the energy storage system is in a second state indicating that power is conveyed via the first terminal to the thermal management system and no power is conveyed via the second terminal; and
    in response to determining that the energy storage system is in the second state, power the thermal management system, and run the thermal management system to manage the temperature within the housing, while a temperature around the energy storage element is not at a set point.

12. The controller of claim 11, wherein the one or more processors are configured to stop the thermal management system in response to a determination that the temperature reaches the set point.

13. The controller of claim 11, wherein the one or more processors are configured to:
  determine whether the first terminal is connected to an external power supply; and
  in response to a determination that the first terminal is connected to the external power supply, power the thermal management system.

14. The controller of claim 13, wherein the one or more processors are configured to:
  in response to a determination that the first terminal is not connected to the external power supply, output a visual indication on a display or send a message to a user device indicating that the energy storage system is not connected to the external power supply.

15. The controller of claim 13, wherein the one or more processors are configured to:
  condition or convert the power received via the first terminal in a different form, the different form including at least one of a different voltage, a different phase, or a different frequency.

16. A method of controlling temperature of energy storage system including a first terminal and a second terminal, comprising:
  determining, by a controller of an energy storage system, that the energy storage system is in a first state, the first state comprising the energy storage system configured to provide electrical power to a grid or load via the second terminal of the energy storage system;
  in response to determining that the energy storage system is in the first state, electrically coupling, via the controller, an energy storage element of the energy storage system to a thermal management system of the energy storage system;
  determining, via the controller, that the energy storage system is in a second state indicating that power is conveyed via the first terminal to the thermal management system and no power is conveyed via the second terminal; and
  in response to determining that the energy storage system is in the second state:
    powering, by the controller, the thermal management system;
    measuring, by the controller, temperature around the energy storage element; and
    in response to a determination that the temperature is not at a set point, running, by the controller, the thermal management system to manage the temperature within the housing.

17. The method of claim 16, further comprising stopping, by the controller, the thermal management system in response to a determination that the temperature reaches the set point.

18. The method of claim 16, further comprising:
    determining, by the controller, whether the first terminal is connected to an external power supply; and
    in response to a determination that the first terminal is connected to the external power supply, providing, via the external power supply, power to the thermal management system.

19. The method of claim 18, further comprising:
    in response to a determination that the first terminal is not connected to the external power supply, generating, by the controller, a visual indication on a display or sending a message to a user device indicating that the energy storage system is not connected to the external power supply.

20. The method of claim 16, further comprising:
    in the second state, providing, via the first terminal, the power to the thermal management system without providing the power to the energy storage element.

\* \* \* \* \*